(12) United States Patent
Fronzoni et al.

(10) Patent No.: US 12,435,764 B2
(45) Date of Patent: Oct. 7, 2025

(54) ANTI-NOISE SHIM

(71) Applicant: OMNIAFIBRE S.R.L., Alife (IT)

(72) Inventors: Gino Fronzoni, Rome (IT); Francesco Surace, Turin (IT)

(73) Assignee: Omnia Advanced Materials S.r.l., Alife (IT)

(*) Notice: Subject to any disclaimer, the term of this patent is extended or adjusted under 35 U.S.C. 154(b) by 345 days.

(21) Appl. No.: 17/924,129

(22) PCT Filed: May 17, 2021

(86) PCT No.: PCT/IB2021/054200
§ 371 (c)(1),
(2) Date: Nov. 9, 2022

(87) PCT Pub. No.: WO2021/234533
PCT Pub. Date: Nov. 25, 2021

(65) Prior Publication Data
US 2023/0175561 A1    Jun. 8, 2023

(30) Foreign Application Priority Data

May 21, 2020 (IT) .................. 102020000011902

(51) Int. Cl.
| | | |
|---|---|---|
| *F16D 65/00* | (2006.01) | |
| *F16D 65/097* | (2006.01) | |
| *F16D 69/00* | (2006.01) | |
| *F16D 69/04* | (2006.01) | |

(52) U.S. Cl.
CPC ..... *F16D 65/0006* (2013.01); *F16D 65/0971* (2013.01); *F16D 2069/007* (2013.01); *F16D 2069/0441* (2013.01)

(58) Field of Classification Search
CPC ............ F16D 65/0006; F16D 65/0971; F16D 2069/007; F16D 2069/0441
USPC .................. 188/73.1, 250 B, 250 G
See application file for complete search history.

(56) References Cited

U.S. PATENT DOCUMENTS

| | | | |
|---|---|---|---|
| 6,105,736 A | 8/2000 | Hiroaki et al. | |
| 6,481,545 B1 * | 11/2002 | Yano | B32B 15/06 188/264 G |
| 9,644,695 B2 * | 5/2017 | Parild | F16D 65/0012 |
| 2004/0188190 A1 * | 9/2004 | Niwa | F16D 65/0971 188/73.37 |
| 2004/0222055 A1 * | 11/2004 | Niwa | F16D 65/0971 188/250 E |

(Continued)

FOREIGN PATENT DOCUMENTS

| | | |
|---|---|---|
| EP | 2942542 A1 | 11/2015 |
| JP | 6208336 B2 | 10/2017 |

OTHER PUBLICATIONS

International Search Report & Written Opinion in PCT/IB2021/054200 dated Jul. 5, 2021.

*Primary Examiner* — Christopher P Schwartz
(74) *Attorney, Agent, or Firm* — Manelli Selter PLLC; Edward Stemberger

(57) ABSTRACT

An anti-noise shim (100) comprising at least a perforated metal layer (110) and at least a high temperature resistant layer (120) faced/coupled together by mechanical bonding wherein the perforated metal layer comprises through holes (111) and mechanical bonding means (112), and the high temperature resistant layer comprises fibers, a filler and a binder.

18 Claims, 6 Drawing Sheets

(56) References Cited

U.S. PATENT DOCUMENTS

2010/0140029 A1* 6/2010 Parild ................. F16D 65/0006
                                                    188/73.37
2012/0152667 A1* 6/2012 Bosco, Jr. ........... F16D 65/0971
                                                    188/251 R
2018/0297326 A1* 10/2018 Arbesman ........... F16D 65/0971

* cited by examiner

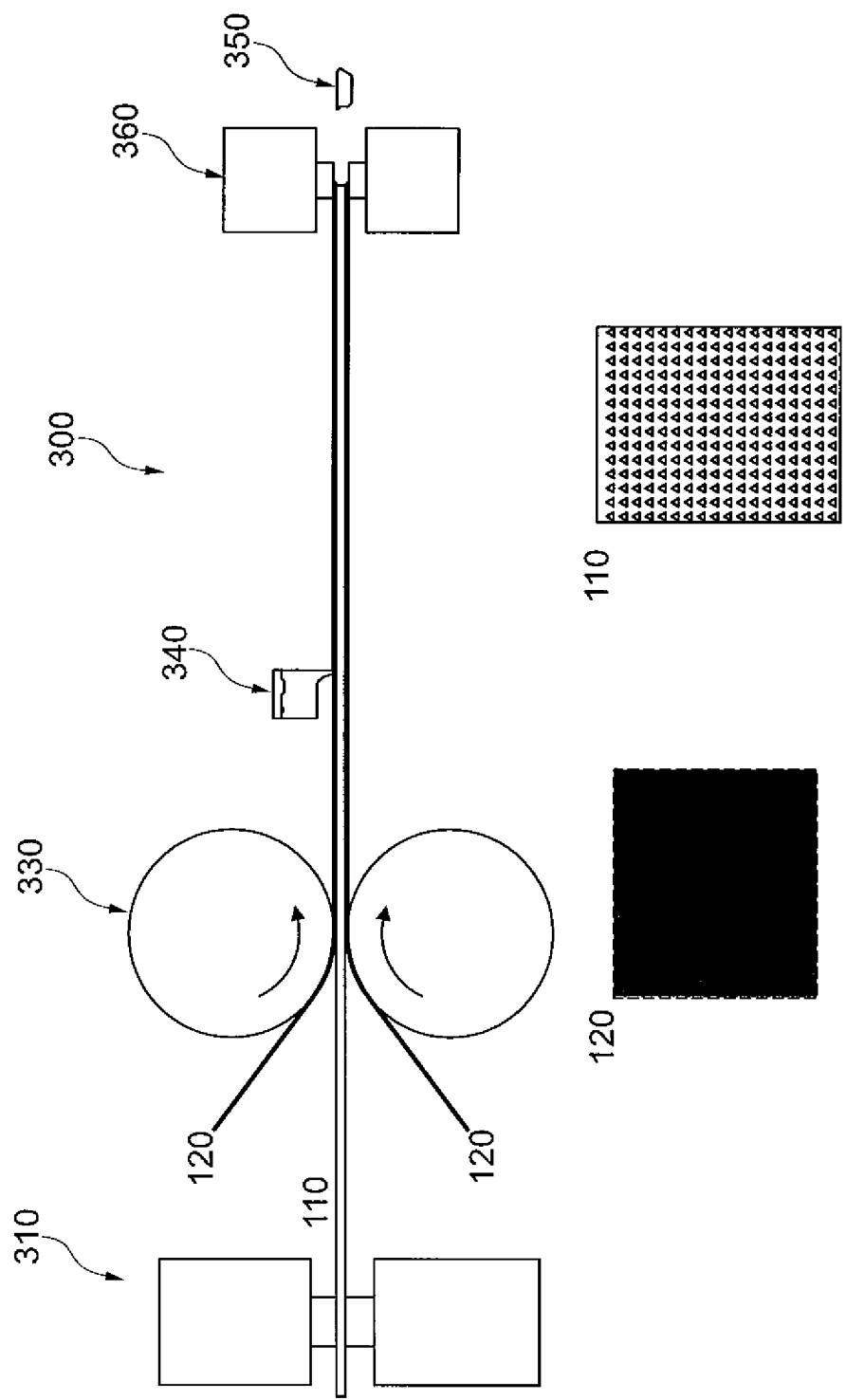

ANTI-NOISE SHIM

FIELD OF THE INVENTION

The present invention relates to an anti-noise shim, more in detail the invention relates to an anti-noise shim comprising a perforated metal layer and a high temperature resistant layer.

BACKGROUND OF THE INVENTION

Vehicle brakes are a critical system that not only reduce car speed but prevent dangerous collisions from occurring and are a design concern for automotive engineers. Drivers are demanding even safer, properly working braking systems, to provide effective vehicle speed reduction, with another important factor, emission of low or zero noise. Brake pads, a major component in braking systems, are designed to create friction against wheel discs to reduce their speed when engaged to contact the disc by hydraulic piston. However, this friction generates unwanted heat energy, vibrations and high pitched noise. Brake pads are engineered to withstand the heat resistance and remain their braking performance but an element called brake pad shim is needed to further absorb this generated heat and protect the sensible elements of car braking system.

A brake pad shim is assembled to a brake pad; it keeps the brake pad and wheel disc perfectly aligned also reducing its vibration, which effectively is perceived as a high pitched piercing noise by a human ear. Critically, brake pad shims by absorbing the vibration reduce noise pollution from vehicles. Shims are also responsible for dissipating heat from the brake pad to prevent overheating in brake liquid system. The extent of the mentioned capabilities are a factor of the brake pad shim material.

Most shim materials used in Aftermarket, are designed with a trade-off of low price for quality. These cheap materials unable to effectively absorb noise within frequencies 1 kHz and 20 kHz to minimise brake noise. Moreover, these lower quality, lower price shim material are unable to dissipate heat in more demanding braking conditions. This may cause brake fluid to boil and brake pads to glaze resulting in the fading of braking power and sudden premature brake failure.

This leads to injuries and fatalities among the car users and pedestrians. The quality of the brake pad shim material coating is very poor resulting in relatively poor heat dissipation properties.

U.S. Pat. No. 6,105,736 discloses an anti-squeal shim (1) comprising a metal layer (3), having mechanical bonding means (6, 15), a pairs at the upper end and another at the lower end of the anti-squeal shim, said metal layer coated on one side thereof by a high temperature resistant layer, a compound layer (2), said anti-squeal shim comprising a hole (5) provided through the anti-squeal shim (see FIGS. 1, 5, 6 and 7, column 4, lines 52-62).

JP 6 208336 B2 discloses an anti-noise shim (107) comprising a metal layer (104) without through holes, having mechanical bonding means (105) with pointed tip (106), coupled to a graphite foil layer (103) (see FIG. 1 and paragraph [0030]).

Therefore, there is the need to develop a new cost competitive anti-noise shim with improved heat dissipation and noise adsorption properties comparable to higher quality higher price already available on the market.

SUMMARY OF THE INVENTION

The present invention deals with a new anti-noise shim which overcomes the drawbacks of the prior art. This is achieved by the anti-noise shim comprising a perforated metal layer and a high temperature resistant layer and related methods for the production application thereof as defined in the independent claims.

Advantages with the anti-noise shim according to the present invention are that it provides excellent heat dissipation and noise absorption properties, whilst being durable, and well suited for mass production by a method comprising an environmentally friendly process. Embodiments of the invention are defined in the dependent claims.

BRIEF DESCRIPTION OF THE SEVERAL VIEWS OF THE DRAWINGS

Particular embodiments of the invention are described in detail herein below, as a way of example and not limited to, with reference to the attached figures, wherein:

FIGS. 3a and 3b show schematic examples of a continuous perforating, bonding and cutting process line.

DETAILED DESCRIPTION OF THE INVENTION

Figure 1A:
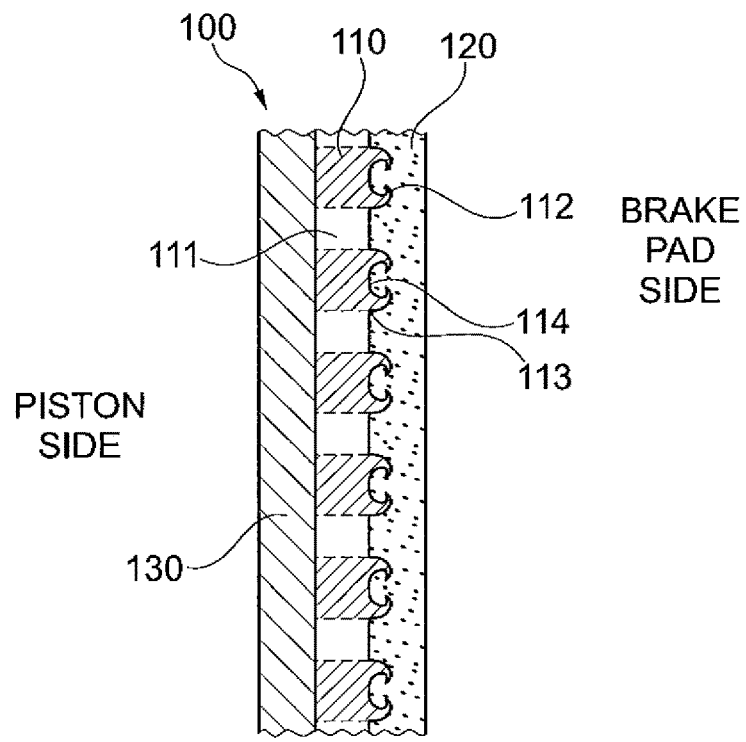
FIGS. 1a to 1b schematically show a number of embodiments of anti-noise shims.

The applicant surprisingly and unexpectedly developed a new Anti-noise shim 100 comprising at least a perforated metal layer 110 and at least a high temperature resistant layer 120 faced/coupled together by mechanical bonding wherein the perforated metal layer comprises through holes 111 and sharped/pointed mechanical bonding means 112, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, and the high temperature resistant layer comprises fibres, a filler and a binder.

Anti-noise shim 100 includes at least a perforated metal layer 110 and at least a high temperature resistant layer 120 faced/coupled together by mechanical bonding wherein the perforated metal layer comprises through holes 111 and sharped/pointed mechanical bonding means 112, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, and the high temperature resistant layer comprises fibres, fillers and a binder, said anti-noise shim further including:

a coating layer 130 bonded on the other side/face of the perforated metal layer or a second high temperature resistant layer, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, mechanically bonded on the other side/face of the perforated metal layer.

Anti-noise shim 100 includes at least a perforated metal layer 110 and at least a high temperature resistant layer 120 faced/coupled together by mechanical bonding wherein the perforated metal layer comprises through holes 111 and sharped/pointed mechanical bonding means 112, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, and the high temperature resistant layer includes fibres, a filler and a binder, said anti-noise shim further comprising a coating layer 130 bonded on the other side/face of the perforated metal layer;
or Anti-noise shim 100 includes at least a perforated metal layer 110 and at least a high temperature resistant layer 120 faced/coupled together by mechanical bonding wherein the perforated metal layer comprises through holes 111 and sharped/pointed mechanical bonding means 112, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, and the high temperature resistant layer includes fibres, a filler and a binder, said anti-noise shim further includes a second high temperature resistant layer 120, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, mechanically bonded on the other side/face of the perforated metal layer.

Moreover, in the anti-noise shim according to any of the embodiments according to the present invention a further thin coating layer 140 might be applied on the high temperature resistant layer 120 when coupled with the perforated metal layer 110.

As a perforated metal layer 110 according to the present invention is meant a metal layer having through holes 111, in particular a metal layer with not less than 1 through hole per 2 square centimeter ($cm^2$) of the surface of the metal layer, preferably 1 through holes/$cm^2$, or 2, 3, 4, 5 or 6 through holes/$cm^2$ of the surface of the metal layer.

In particular through holes have diameter not less than 0.5 mm and not more than 3.0 mm, preferably not less than 1.0 mm and not more than 1.5 mm.

In particular the perforated metal layer 110 has a thickness preferably of not less than 300 µm and not more than 500 µm, more preferably not less than 360 µm and not more than 400 µm.

Such a perforated metal layer 110 may e.g. be comprised of iron, zinc-plated steel, stainless steel, aluminum or the like.

As mentioned, the high temperature resistant layer 120, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, comprises fibres, a filler and a binder. According to one embodiment, the binder is an elastomeric binder, but it may also be a non-elastomeric resin type binder. Compared to conventional rubber materials, the fibres make the material stronger and less elastic in the plane without considerably affecting the compression characteristics in the normal direction. Moreover, the fibres and the fillers reduce the amount of elastomeric binder in the layer, thereby making the layer less expensive. According to one embodiment, the fibres content in the high temperature resistant layer 120 is not less than 5%, or 10%, or 14%, and not more than 23% or 30% by weight. However, for some applications the fibres content may be higher than 30%, such as up to 50% or up to 80% or even up to 95%. The fibres are selected from organic fibres depending on the specific application. Examples of organic fibres include: cellulose fibers cotton linters fibers (fibers coming from plants, in general) aromatic polyamide fibres, polyamide fibres other than aromatic polyamide fibres, polyolefine fibres, polyester fibres, polyacrylonitrile fibres, polyvinyl alcohol fibres, polyvinylchloride fibres, polyurea fibres, polyurethane fibres, polyfluorocarbon fibres, phenol fibres, or the like. According to one embodiment, the fibres comprises aromatic polyamide fibers. More preferably the the fibers are selected from inorganic fiber such as carbon fibres, glass fibre, ceramic fibre, rock wool, mineral wool, fused quartz fibre, chemical processed high silica fibre, fused alumina silicate fibre, alumina continuous fibre, stabilized zirconia fibre, boron nitride fibre, alkali titanate fibre, whiskers, boron fibre, wollastonite, basalt fibre. The filler may be an inorganic filler such as clay, ash, talc, barium sulfate, sodium bicarbonate, graphite, lead sulfate, tripoli, wollastonite, or an organic filler. The binder may be an elastomeric material of rubber type such as styrene-butadiene rubber (SBR), acrylonitrile-butadiene rubber (nitrile-butadiene rubber, NBR), isoprene rubber (IR), chloroprene rubber (CR), butadiene rubber (BR), isobutylene-isoprene rubber (IIR), ethylene propylene rubber (EPM), fluoro rubber (FPM), silicone rubber (Si), chlorosulfonated polyethylene (CSM), ethylene-vinylacetate copolymers (EVA), chlorinated polyethylene (CPE), chloro-isobutane-isoprene rubber (CIR), epichlorohydrin rubber (ECO), nitrile isoprene rubber (NIR) or the like. Elastomers other than rubbers may also be used. According to alternative embodiments the binder is a resin type material such as a rubber modified phenolic resin, a phenolic resin, an epoxy resin or the like.

In particular the high temperature resistant layer 120 has a thickness preferably not less than 50 µm and not more than 600 µm, more preferably not less than 150 µm and not more than 300 µm.

According to one embodiment, the coating layer 130 is a visco-elastic layer. The visco-elastic layer may be a latex (SBR, NBR, chloroprene, acrylic or the like), synthetic resins (acrylic, phenolic or the like, PTFE, polyurethanes, a visco elastic adhesive such as an acrylic or silicone based adhesive or the like, but it may be any visco elastic material with suitable vibration absorption and thermal resistance properties at the conditions that a shim is subjected to when mounted in a disc brake.

In particular, the coating layer 130 has a thickness preferably not less than 30 µm and not more than 200 µm, more preferably not less than 80 µm and not more than 150 µm.

Said optional thin coating layer 140 comprises thermoresistant polymeric material such as PTFE, silicones, polyurethanes, synthetic resins, in particular with a thickness of not less than 10 µm and not more than 100 µm, preferably not less than 20 µm and not more than 80 µm.

Said thin coating layer 140 is applied on the high temperature resistant layer 120 as a top layer.

Step application or bonding of coating layer 130 and/or thin coating layer 140 can be performed in different way: rolls, bath saturation, spraying, wetting, etc.

The anti-noise shim 100 according to any of the embodiments according to the present invention is an advanced anti-noise shim comprising multi-layer material with its application in the brake shims. It is made by mechanically bonding at least a high temperature resistant layer 120 comprising binders, an elastomeric material of latex rubber type such as specialized Nitrile Butadiene Rubber (NBR) Styrene Binder Rubber (SBR) latex material or the like, fibres, such as inorganic fibers, and fillers, with a perforated metal layer 110. Said perforated metal layer 110 is characterized by through holes 111 and sharped/pointed mechanical bonding means 112, jointly/united with the perforated metal layer 110 and, where present, located at the edge 113 of the through holes 111 on at least a mechanically bonding surface 114 of the perforated metal layer 110. Perforated metal layer 110 having through holes 111, absorbs resonant frequencies better than a solid metal layer. Moreover, the high temperature resistant layer 120 according to the present invention is produced from adapting gasket technology, which involves infusing the binder, such as raw NBR (or SBR or other types) Latex, with fibres and fillers. Said adapted gasket technology makes the anti-noise shims according to any of the embodiments according to the present invention more temperature resistant while the perforations of the metal layer 120 make it a perfect material for high frequency noise absorption.

The anti-noise shim according to the present invention is an advanced anti-noise shim comprising multi-layer composite wherein the perforated metal layer/sheet 110 is mechanically bonded with at least a, or sandwiched by mechanical bonding between two, high temperature resistant layer 120 comprising binders, an elastomeric material of rubber type, such as specialised Nitrile Butadiene Rubber (NBR) material, fibres, such as organic and inorganic fibers and fillers.

Perforating the metal layer/sheet facilitates the mechanical bonding step of the different shim layers. The noise absorption properties by leaving voids in the metal. Vibration of air molecules within the voids, due to the through holes 111, of the perforated metal layer 110, helps in dissipating high frequency noise being generated by the vibrations of the brake disk & pads thereby damping the noise.

The high temperature resistant layer 120, according to the present invention, is produced from adapting gasket technology, which involves infusing the binder, an elastomeric material of rubber type, preferably the raw NBR (or SBR or other types) latex, with fibres, preferably the inorganic fibres, and fillers. NBR (or SBR or the like) latex is a milky white liquid emulsion of synthetic rubber. Overall the gasket technology is more resistant to higher temperatures than a 100% NBR coated layer. Additionally, the perforated metal layer concept makes distribution of the high frequency vibrations much more effective and absorbed in the compound material easier. The mechanical bonding step (pressing the high temperature resistant layer/sheet 120, according to the present invention, on the perforated metal layer 110 characterized by through holes 111 and sharped/pointed mechanical bonding means 112, jointly/united with the perforated metal layer 110 and, where present, located at the edge 113 of the through holes 111 on at least a mechanically bonding surface 114 of the perforated metal layer 110) requires no gluing agent nor solvents to form a strong bond during the process. This eliminates the need of solvents used in actual technology for shim production. In the mechanical bonding step the pressure applied is sufficient to make the sharped/pointed mechanical bonding means 112 fold in on themselves to grip the perforated metal layer/sheet and the high temperature resistant layer/sheet to each other.

For "mechanical bonding means" 112 or "mechanical bonding means 112" according to the present invention, it is meant means of bonding/mechanical constraint 112 or means of linking 112 or means of fastener 112 for the mechanical joining between the perforated metal layer 110 coupled with the high thermal resistant layer/s 120.

The technical advantages due to the anti-noise shims according to any of the embodiments according to the present invention, the method to produce the same and the use thereof in a disc brake arrangement are as follows:
- the anti-noise shim according to the present invention has improved heat resistance and noise absorption increase;
- the anti-noise shim according to the present invention is produced using novel low cost, energy saving, solvent free continuous process making it affordable, ready availability & reliable raw material supply;
- the anti-noise shim according to the present invention acts as a thermal barrier preventing excessive heat getting to the brake fluid causing it to boil & resulting in brake loss: preventing brake fade.

It is a further object of the present invention the use of the anti-noise shims according to any of the embodiments according to the present invention in a disc brake arrangement comprising a calliper (brake caliper/brake calliper) and a brake pad, the anti-noise shim/anti-noise brake shim being configured to act between the calliper and the brake pad.

Figure 1B:
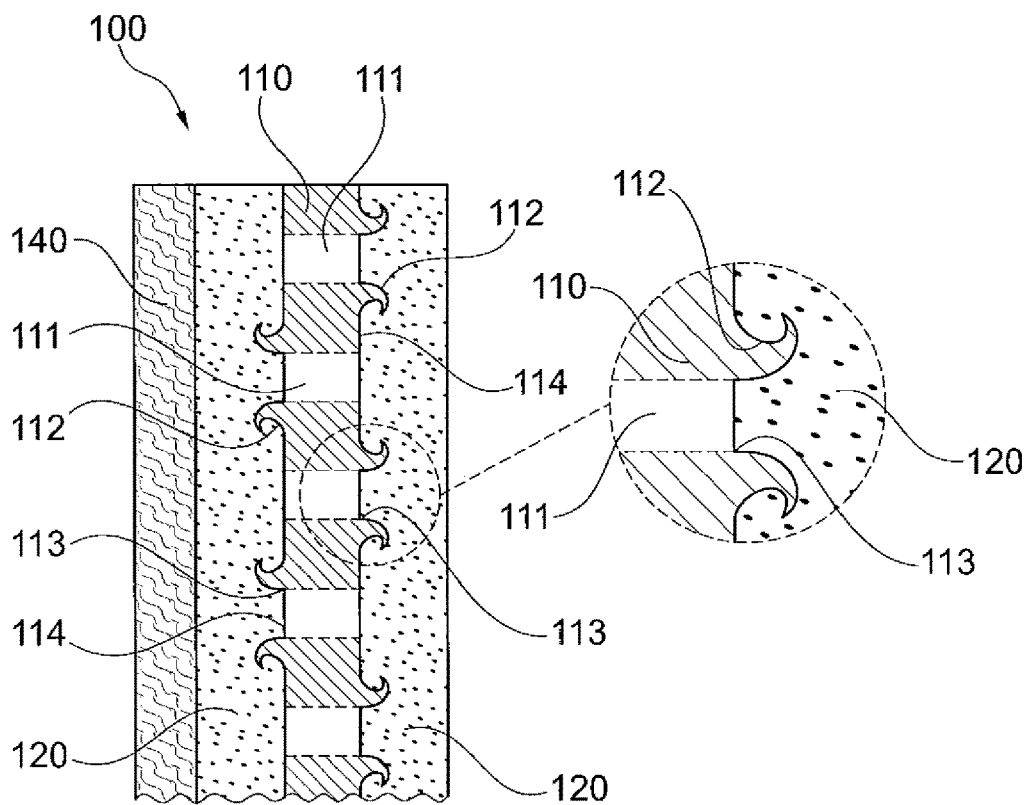

FIGS. 1a and 1b schematically show a number of embodiments of anti-noise shims 100 according to the present invention with at least a perforated metal layer 110 and at least a high temperature resistant layer 120 faced/coupled together by mechanical bonding wherein the perforated metal layer comprises through holes 111.

The figures shall be regarded as illustrative only, and the relative dimensions of different layers have no significance.

In particular, as an embodiment of the anti-noise shim according to the present invention, FIG. 1a shows an anti-noise shim 100 with at least a perforated metal layer 110 and at least a high temperature resistant layer 120 faced/coupled together by mechanical bonding wherein the perforated metal layer comprises through holes 111, said anti-noise shim further comprising a coating layer 130 bonded on the other side/face of the perforated metal layer.

In particular, in FIG. 1a is shown the perforated metal layer 110 characterized by through holes 111 and sharped/pointed mechanical bonding means 112, preferably with hook shape, at least one or two or three or four mechanical bonding means for each through hole, said mechanical bonding means jointly/united with the perforated metal layer 110 and, where present, located at the edge 113 of the through holes 111 on at least a mechanically bonding surface 114 of the perforated metal layer 110, mechanically bonding surface on which is mechanically bonded the high temperature resistant layer 120, while the coating layer 130 is bonded on the other side/face of the perforated metal layer.

In particular, as an embodiment of the anti-noise shim according to the present invention, FIG. 1b shows an anti-noise shim 100 with at least a perforated metal layer 110 and at least a high temperature resistant layer 120 faced/coupled together by mechanical bonding wherein the perforated metal layer comprises through holes 111, said anti-noise shim further comprising a second high temperature resistant layer 120 mechanically bonded on the other side/face of the perforated metal layer.

In particular, in FIG. 1b is shown the perforated metal layer 110 characterized by through holes 111 and sharped/pointed mechanical bonding means 112, preferably with hook shape, at least one or two or three or four mechanical bonding means for each through hole, said mechanical bonding means jointly/united with the perforated metal layer 110 and, where present, located at the edge 113 of the through holes 111 on the mechanically bonding surfaces 114 of the perforated metal layer 110, mechanically bonding surfaces on which the high temperature resistant layers 120 are mechanically bonded. Moreover, a thin coating layer 140 is, or might be, applied as top layer on a high temperature resistant layer 120.

There is also provided methods of producing anti-noise shim of the type disclosed herein.

Figure 2A:
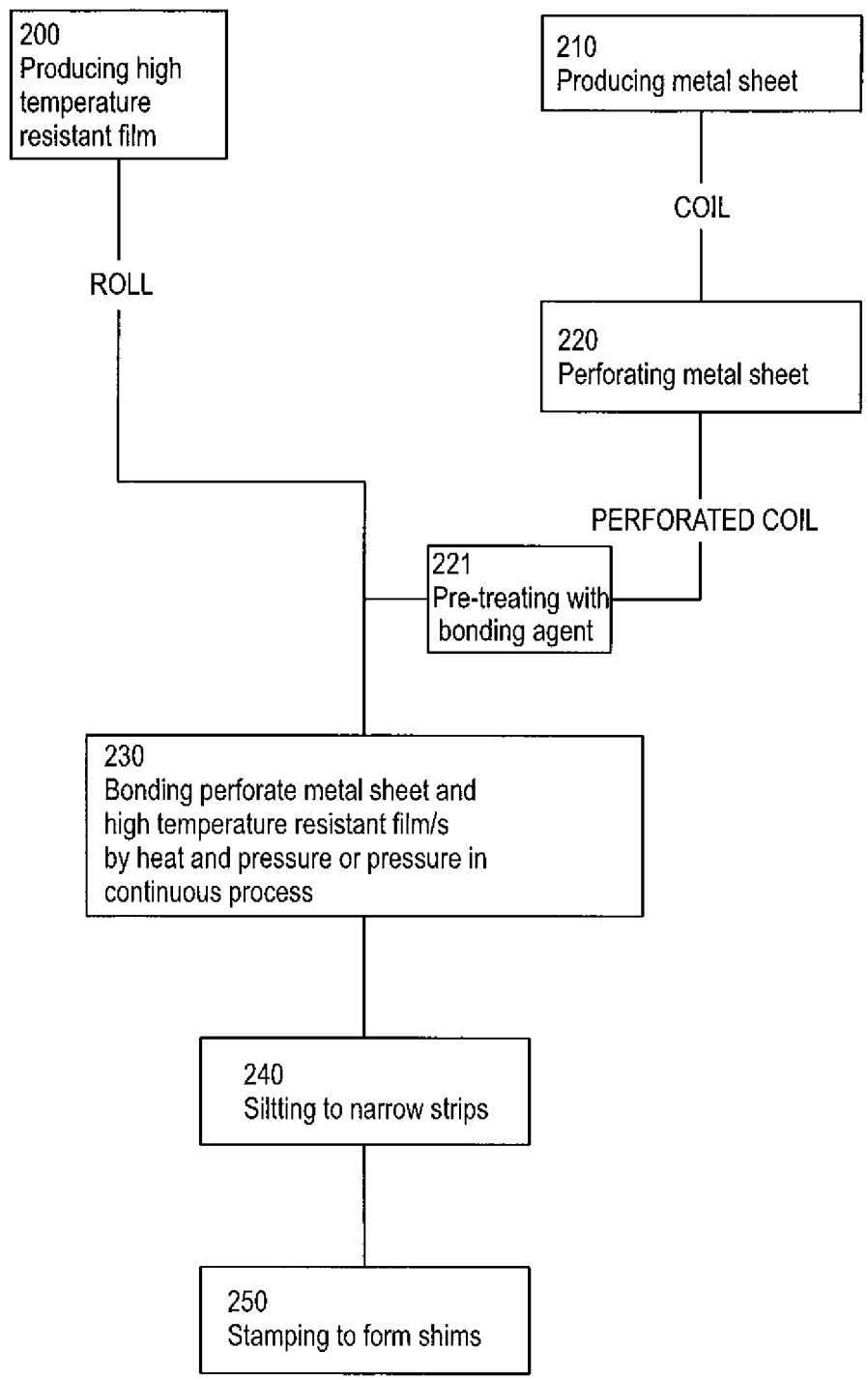
FIGS. 2a and 2b schematically show methods of producing anti-noise shims.
Figure 2B:
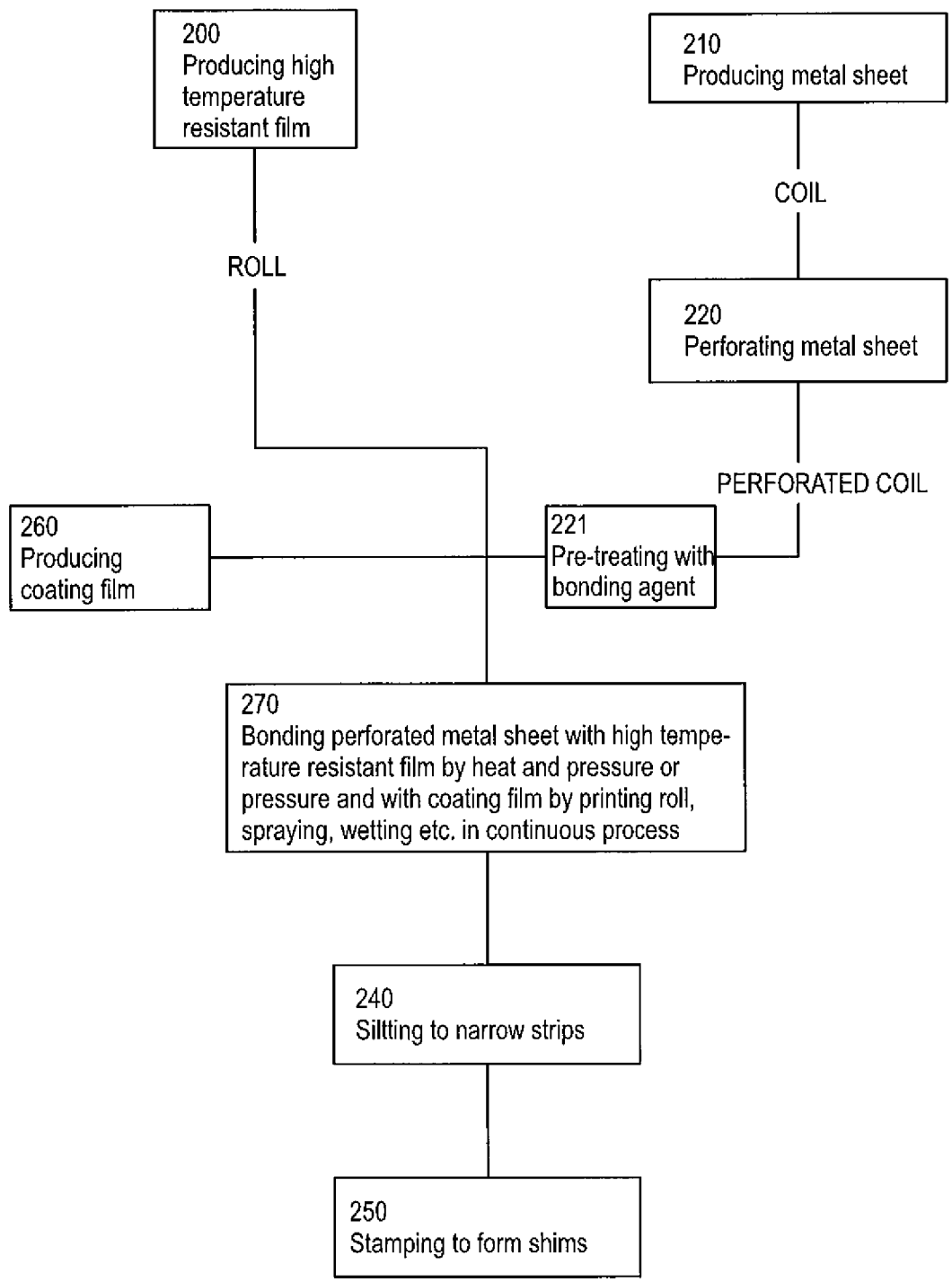

The steps of the methods are schematically shown in FIGS. 2a and 2b.

It is a further object of the present invention to provide a method of producing anti-noise shim 100 in accordance with any embodiment of the present invention, said method comprising the steps:
- providing a perforated metal sheet 110 comprising through holes 111 and mechanical bonding means 112,
- mechanically bonding, by applying pressure or pressure and temperature a high temperature resistant sheet 120, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, comprising fibres, a filler and a binder on at least one side of the perforated metal sheet to form an anti-noise shim sheet.

As a further method of producing anti-noise shim 100 in accordance with any embodiment of the present invention, said method comprises the steps:
- providing a perforated metal sheet 110 comprising through holes 111 and mechanical bonding means 112,
- mechanically bonding by applying pressure or pressure and temperature a high temperature resistant sheet 120, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, comprising fibres, a filler and a binder on at least one side of the perforated metal sheet,
- providing a further high temperature resistant sheet 120,
- mechanically bonding by applying pressure or pressure and temperature the further high temperature resistant sheet on at least one non-bonded side of the perforated metal sheet, to form an anti-noise shim sheet, i.e. a method wherein the further high temperature resistant sheet is mechanically bonded on the opposite side of the perforated metal sheet respect where the temperature resistant material sheet 120 is mechanically bonded, or a method wherein two high temperature resistant sheets 120 are mechanically bonded on the opposite sides/both sides of the perforated metal sheet 110, to form anti-noise shim.

As a further method of producing anti-noise shim 100 in accordance with any embodiment of the present invention, said method comprises the steps:
- providing a perforated metal sheet 110 comprising through holes 111 and mechanical bonding means 112,
- mechanically bonding by applying pressure or pressure and temperature a high temperature resistant sheet 120, a continuous high temperature resistant layer 120, in particular a continuous high temperature resistant layer 120 in correspondence of the through holes 111 of the perforated metal layer 110, as clearly reported in the figures, such as FIG. 1a, 1b, 3a, 3b, comprising fibres, a filler and a binder on at least one side of the perforated metal sheet,
- providing a coating sheet 130,
- bonding the coating sheet on at least one non-bonded side of the perforated metal sheet, to form an anti-noise shim sheet, i.e. a method wherein a coating sheet 130 is bonded on the opposite side of the perforated metal sheet 110 respect where the temperature resistant material 120 is mechanically bonded, to form an anti-noise shim.

Every of the above mentioned methods according to the present invention can optionally further comprise a step wherein a further thin coating layer 140 is applied/bonded on the high temperature resistant layer/sheet 120, in particular when the high temperature resistant layer/sheet 120 is mechanically bonded/already mechanically bonded to the perforated metal layer 110.

All the methods of producing anti-noise shims of the type according to the present invention are characterized by providing at least a perforated metal sheet/s 110. Said perforated metal sheet 110 is obtained by perforation of metal sheet (Perforation is applied with a perforation machine, such as 1 or 2 perforating rolls or a high power hydraulic press that, with a specifically designed perforating mould/s, perforates the metal when said perforating mould/roll/s is/are pressed on a surface/side of the metal layer: perforation step) producing a perforated metal sheet with through holes 111 with sharped/pointed mechanical bonding means 112, preferably with hook shape, at least one or two or three or four mechanical bonding means for each through hole, said mechanical bonding means jointly/united with the perforated metal layer 110 and, where present, located at the edge 113 of the through hole 111 on at least a mechanically bonding surface 114 of the perforated metal layer 110. This perforation could be realized just on one side or on both sides of the metal layer/sheet.

Accordingly, the perforated metal layer/sheet 110 has through holes 111 with sharped/pointed mechanical bonding means 112, preferably with hook shape, at least one or two or three or four mechanical bonding means for each through hole, said mechanical bonding means jointly/united with the perforated metal layer/sheet 110 and, where present, located at the edge 113 of the through holes 111 on at least a mechanically bonding surface 114 of the perforated metal layer 110.

Said perforation step, when present in any embodiments of the method of producing anti-noise shim of the type according to the present invention, always precedes the step of providing the perforated metal sheet 110.

In the perforation step the specifically designed perforating roll/mould/s has/have perforation tip/s, preferably but not only star shape tip/s (at least 1 tip per $cm^2$), designed to produce through holes 111 in the metal layer/sheet and sharped/pointed mechanical bonding means 112, jointly/united with the perforated metal layer 110, located at the edge 113 of the through holes 111, on the surface/side 114 of the perforated metal layer/sheet, which is opposite to the surface/side of the perforated metal layer/sheet on which the perforating roll/mould/s is pressed on.

When both surfaces/sides of the perforated metal layer/sheet have sharped/pointed mechanical bonding means 112 (I.e. both mechanically bonding surface 114), the sharped/pointed mechanical bonding means on one surface/side are shifted with respect to the sharped/pointed mechanical bonding means on the other surface/side, i.e. each through hole 111 has sharped/pointed mechanical bonding means 112 at the edge 113 thereof on only one surface/side of the perforated metal layer/sheet (see FIG. 1b). Accordingly, in the corresponding perforation step, both surfaces/sides of the metal layer/sheet are perforated by pressing each face/side with a perforation mould/roll wherein the perforation tips of one perforation mould/roll are shifted with respect to the perforation tips of the other perforation mould/roll.

Bonding of different sheets to each other: bonding perforated metal sheet with high temperature resistant sheet/s by mechanical bonding, or bonding perforated metal sheet with high temperature resistant sheet by mechanical bonding and with coating sheet by bonding involving use of a bonding agent, such as resin, cyan, acrylic type adhesive or the like, or by vulcanization, may be performed in any suitable way providing a sufficiently strong bond there between. The bonding involve the step of applying pressure or pressure and heat or just heat. In order for the method to be efficient, the bonding may involve continuous rolling, whereby the perforated metal sheet and the high temperature resistant film/sheet/s are provided/produced in the form coils 210 or rolls 200 respectively. In the bonding step 230/270, comprising the mechanical bonding step, the pressure applied is sufficient to make the sharped/pointed mechanical bonding means 112, of the perforated metal layer/sheet 110, fold in on themselves to grip the perforated metal layer/sheet 110 and the high temperature resistant layer/sheet 120 to each other, while coating film/sheet 130 is applied/bonded by printing roll, spraying, wetting, bath saturation, etc.. Also the thin coating layer/sheet/film 140 is applied/bonded by printing roll, spraying, wetting, bath saturation, etc., when present.

Anti-noise shim/s of the type according to the present invention, are obtained as anti-noise shim sheet of the type according to the present invention, said anti-noise shim sheet of the type according to the present invention can be enrolled to form coils.

A further optional step of cutting out individual anti-noise brake shims from the anti-noise shim sheet, may be performed by any suitable method, such as stamping or similar methods. According to one embodiment, the method comprises the step of slitting 240 the coils into narrow coils after the bonding step 230/270. Thereafter individual anti-noise brake shims are cut out from the narrow coils.

In order to achieve a strong bond and to minimize the steps in the bonding operation, the perforated metal sheet may be pre-treating with a bonding agent before the step of bonding 230/270.

Figure 3B:
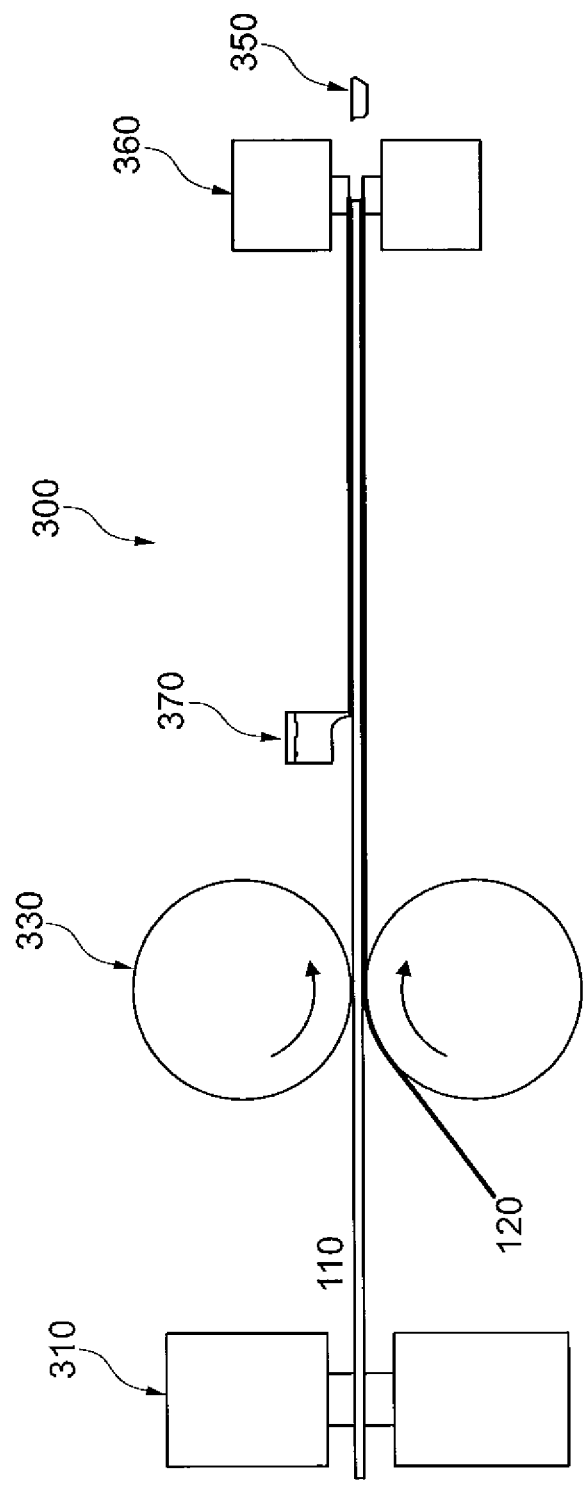

Also the step of pre-treating 221 may be performed in a continuous process. FIG. 3a-3b show schematic examples of a continuous perforating, bonding and optionally cutting process line 300.

FIG. 3a shows a schematic example of a continuous perforating, bonding and optionally cutting process line 300, wherein the perforated metal sheet 110, obtained by a perforation machine 310 acting on a metal sheet provided in form of coils, not represented, and the high temperature resistant sheets 120 to be bonded together, are provided in the form of coils or rolls, not represented. The sheets 110 and 120 are pressed together and bonded by a pair of calender rolls 330 to form a layered anti-noise shim sheet according to the present invention. Optionally, a thin coating layer 140 is applied on the surface of the high temperature resistant layer of the layered anti-noise shim sheet by a wet application process 340.

As a further optional step, individual anti-noise brake shims 350 are cut out from the anti-noise shim sheet by a stamping machine 360. ig. 3b shows a schematic example of a continuous perforating, bonding and optionally cutting process line 300, wherein the perforated metal sheet 110, obtained by a perforation machine 310 acting on a metal sheet provided in form of coils, not represented, and the high temperature resistant sheet 120 to be bonded together, are provided. The sheets 110, and 120 are pressed together and bonded by a pair of calender rolls 330 to form a layered sheet. The coating layer 130 is applied on the no-bonded surface of the perforated metal layer 110 of the layered sheet by a wet application process 370 to form anti-noise shim sheet according to the present invention. As a further optional step, individual anti-noise brake shims 350 are cut out from the anti-noise shim sheet by a stamping machine 360.

Figure 4:
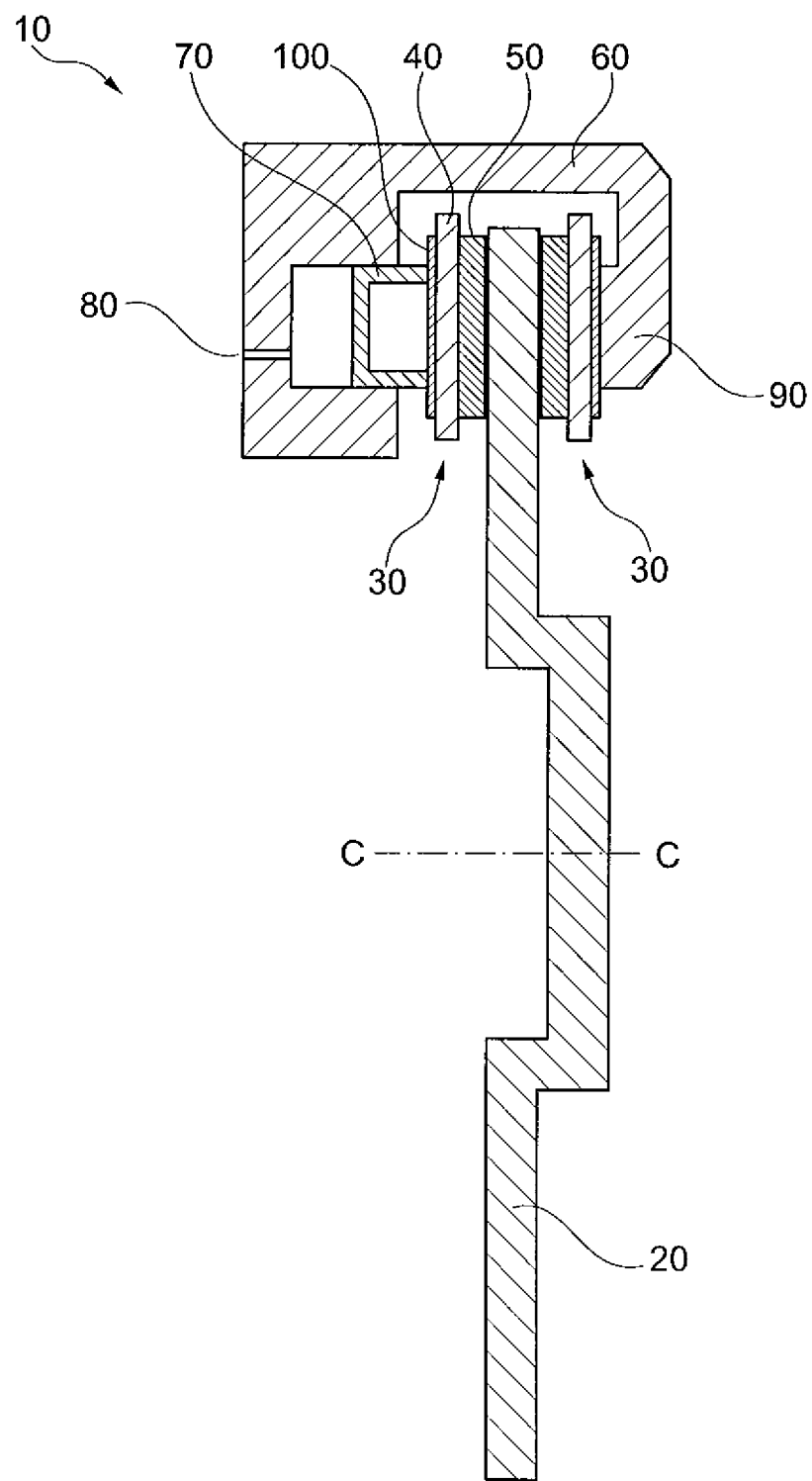
FIG. 4 shows a schematic example of a disc brake.

FIG. 4 shows a schematic example of a disc brake 10, as an example of those disc brakes already known in the art, said disc brake 10 known in the art comprising a disc 20 arranged to rotate about the axis C-C. A pair of brake pads 30 each having a backing plate 40 supporting a friction member 50 on the disc side thereof, a brake calliper 60 supporting the brake pads 30 movably toward and away from opposite friction surfaces of the disc 20, and hydraulic actuating means in the form of a brake piston 70 for urging the brake pads against the disc. The brake piston 70 is hydraulically actuated via the fluid path 80 connected to the hydraulic brake system of a vehicle. In the disclosed embodiment, the disc brake 10 the calliper housing 60 is moveable in the actuation direction of the brake piston, whereby the brake pad on the non piston side is urged against the disc by a calliper finger 90 of the calliper housing 60. An anti-noise shim 100 is arranged adjacent the backing plate 40 of each disc pad 30 and the brake force from the brake piston 70 and calliper finger 65 respectively is transferred to the brake pads 30 via the anti noise shims 100. Throughout this description, the expression "brake pad side" refers to the side of an anti noise shim 100 that face the backing plate 40 of a brake pad 30 and the expression "piston side" refers to the non pad side, i.e. the side that faces the piston 70 or the calliper finger 90. In some disc brake designs, the calliper finger 90 is omitted and the calliper 60 is provided with brake pistons 70 on both sides of the disc 20. However, throughout this description, the above expressions include any such non disclosed disc brake arrangements.

There is also provided a disc brake arrangement comprising an anti-noise shim according to anyone of the above embodiments between the calliper and the brake pad, and the disc brake may be arranged in a suitable vehicle —such as a car, truck, train, motorbike, bicycle etc.

In order to fully utilize the anti-noise shims according to the invention, there is further provided a method to prevent noise in a disc brake, comprising the step of arranging an anti-noise shim according to anyone of the above embodiments between the calliper and the brake pad.

The invention claimed is:

1. Anti-noise shim comprising at least a perforated metal layer and at least a high temperature resistant layer faced/coupled together by mechanical bonding wherein the perforated metal layer comprises through holes and mechanical bonding means, and the high temperature resistant layer comprises fibers, a filler and a binder material, said perforated metal layer is characterized by leaving voids in the metal due to the through holes and sharped/pointed mechanical bonding means jointly/united with the perforated metal layer and, where present, located at the edge of the through holes on at least a mechanically bonding surface of the perforated metal layer.

2. Anti-noise shim according to claim 1 further comprising a coating layer bonded on the other side/face of the perforated metal layer.

3. Anti-noise shim according to claim 2 wherein the coating layer is a visco-elastic layer.

4. Anti-noise shim according to claim 1 further comprising a second high temperature resistant layer mechanically bonded on the other side/face of the perforated metal layer.

5. Anti-noise shim according to claim 1 wherein a further thin coating layer is applied/bonded on the high temperature resistant layer.

6. Anti-noise shim according to claim 1 wherein the fibre content by weight in the high temperature resistant layer is 95% or less.

7. Anti-noise shim according to claim 1 wherein the fibres comprise synthetic organic fibers, such as cellulose fibers, cotton linters fibers (fibers coming from plants, in general), aromatic polyamide fibres, aramidic fibres, polyamide fibres other than aromatic polyamide fibres, polyolefine fibres, polyester fibres, polyacrylonitrile fibres, polyvinyl alcohol fibres, polyvinylchloride fibres, polyurea fibres, polyurethane fibres, polyfluorocarbon fibres, phenol fibres, and/or inorganic fibres such as, carbon fibres, glass fibre, ceramic fibre, rock wool, mineral wool, fused quartz fibre, chemical processed high silica fibre, fused alumina silicate fibre, alumina continuous fibre, stabilized zirconia fibre, boron nitride fibre, alkali titanate fibre, whiskers, boron fibre, wollastonite, basalt fibre.

8. Anti-noise shim according to claim 1 wherein the filler material comprises an inorganic filler material such as clay, ash, talc, barium sulfate, sodium bicarbonate, graphite, lead sulfate, tripoli, wollastonite, or an organic filler.

9. Anti-noise shim according to claim 1 wherein the binder material comprises an elastomeric material of latex/rubber type such as styrene-butadiene rubber (SBR), acrylonitrile-butadiene rubber (nitrile rubber, NBR), isoprene rubber (IR), chloroprene rubber (CR), butadiene rubber (BR), isobutylene-isoprene rubber (IIR), ethylene propylene rubber (EPM), fluoro rubber (FPM), silicone rubber (Si), chlorosulfonated polyethylene (CSM), ethylene-vinylacetate copolymers (EVA), chlorinated polyethylene (CPE), chloro-isobutane-isoprene rubber (CIIR), epichlorohydrin rubber (ECO), nitrile isoprene rubber (NIR) or the like, or the binder material comprises a resin type material such as a rubber modified phenolic resin, a phenolic resin, an epoxy resin or the like.

10. Anti-noise shim according to claim 1, wherein the shim is a brake shim.

11. Anti-noise shim according to claim 1 wherein the fibre content by weight in the high temperature resistant layer is 50% or less.

12. Anti-noise shim according to claim 1 wherein the fibre content by weight in the high temperature resistant layer is 30% or less.

13. Anti-noise shim according to claim 1 wherein the fibre content by weight in the high temperature resistant layer is 23% or less.

14. Method of producing anti-noise shim comprising the steps:
providing a perforated metal sheet comprising through holes and mechanical bonding means, said perforated metal sheet is characterized by leaving voids in the metal due to the through holes and sharped/pointed mechanical bonding means jointly/united with the perforated metal sheet and, where present, located at the edge of the through holes on at least a mechanically bonding surface of the perforated metal sheet, and
mechanically bonding, by applying pressure or pressure and temperature, a high temperature resistant sheet comprising fibres, a filler and a binder on at least one side of the perforated metal sheet to form an anti-noise shims sheet.

15. Method according to claim 14 comprising the steps:
providing a further high temperature resistant sheet, and
mechanically bonding, by applying pressure or pressure and temperature, the further high temperature resistant sheet on at least one non-bonded side of the perforated metal sheet.

16. Method according to claim 14 further comprising the steps:
providing a coating sheet, and
bonding the coating sheet on at least one non-bonded side of the perforated metal sheet.

17. Method according to claim 14, wherein the bonding involves continuous rolling.

18. Disc brake arrangement comprising:
a caliper,
a brake pad, and
an anti-noise brake shim comprising at least a perforated metal layer and at least a high temperature resistant layer faced/coupled together by mechanical bonding wherein the perforated metal layer comprises through holes and mechanical bonding means, and the high temperature resistant layer comprises fibers, a filler and a binder material, said perforated metal layer is characterized by leaving voids in the metal due to the through holes and sharped/pointed mechanical bonding means jointly/united with the perforated metal layer and, where present, located at the edge of the through holes on at least a mechanically bonding surface of the perforated metal layer,
wherein the anti-noise brake shim is disposed between the caliper and the brake pad.

\* \* \* \* \*